United States Patent

[11] 3,600,791

| [72] | Inventor | Charles Robert Talmage<br>New Canaan, Conn. |
|---|---|---|
| [21] | Appl. No. | 796,241 |
| [22] | Filed | June 14, 1968 |
| [23] | | Division of Ser. No. 433,563, Feb. 18, 1965, abandoned |
| [45] | Patented | Aug. 24, 1971 |
| [73] | Assignee | Motor Wheel Corporation<br>Akron, Ohio |

[54] METHOD OF MAKING A COMPOSITE BRAKE DRUM
5 Claims, 6 Drawing Figs.

[52] U.S. Cl. .................................................. 29/420.5,
29/149.5 P/M, 29/504, 18/16.5
[51] Int. Cl. .................................................. B22f 3/24
[50] Field of Search .................................................. 29/420.5,
420, 149.5 S, 149.5 PM, 504; 18/16.5; 188/218

[56] References Cited
UNITED STATES PATENTS

| 2,373,405 | 4/1945 | Lowit | 29/420 |
|---|---|---|---|
| 2,398,227 | 4/1946 | Hubbert | 18/16.5 |
| 2,793,427 | 5/1957 | Marvin | 29/420.5 |
| 3,172,156 | 3/1965 | Belder | 18/16.7 |
| 3,334,400 | 8/1967 | Jaeger | 29/420 X |
| 3,341,931 | 9/1967 | Libbin et al. | 29/420.5 |
| 2,810,929 | 10/1957 | Willi | 18/16.7 |
| Res. 21,495 | 6/1940 | Short | 29/149.5 X |
| 2,287,952 | 6/1942 | Tormyn | 188/218 |
| 3,153,990 | 10/1964 | Kunzog | 29/149.5 X |

*Primary Examiner*—John F. Campbell
*Assistant Examiner*—D. C. Reiley
*Attorney*—Barnes, Kisselle, Raisch & Choate

ABSTRACT: A method of making a composite brake drum having an axially perforated sintered metal drum ring and a stamped steel mounting back attached to one end of the drum ring. The drum ring is compacted from ferrous powder in an annular cavity of a compacting press while a plurality of tapered core pins are disposed in circumferentially spaced relation in and extending axially through the cavity. The compact is stripped from the cavity and pins by movement of the compacting punches relative thereto. The compact is sintered to complete the drum ring and thereafter a stamped steel back is secured to the ring by arc welding a continuous welded seam between the ring and back.

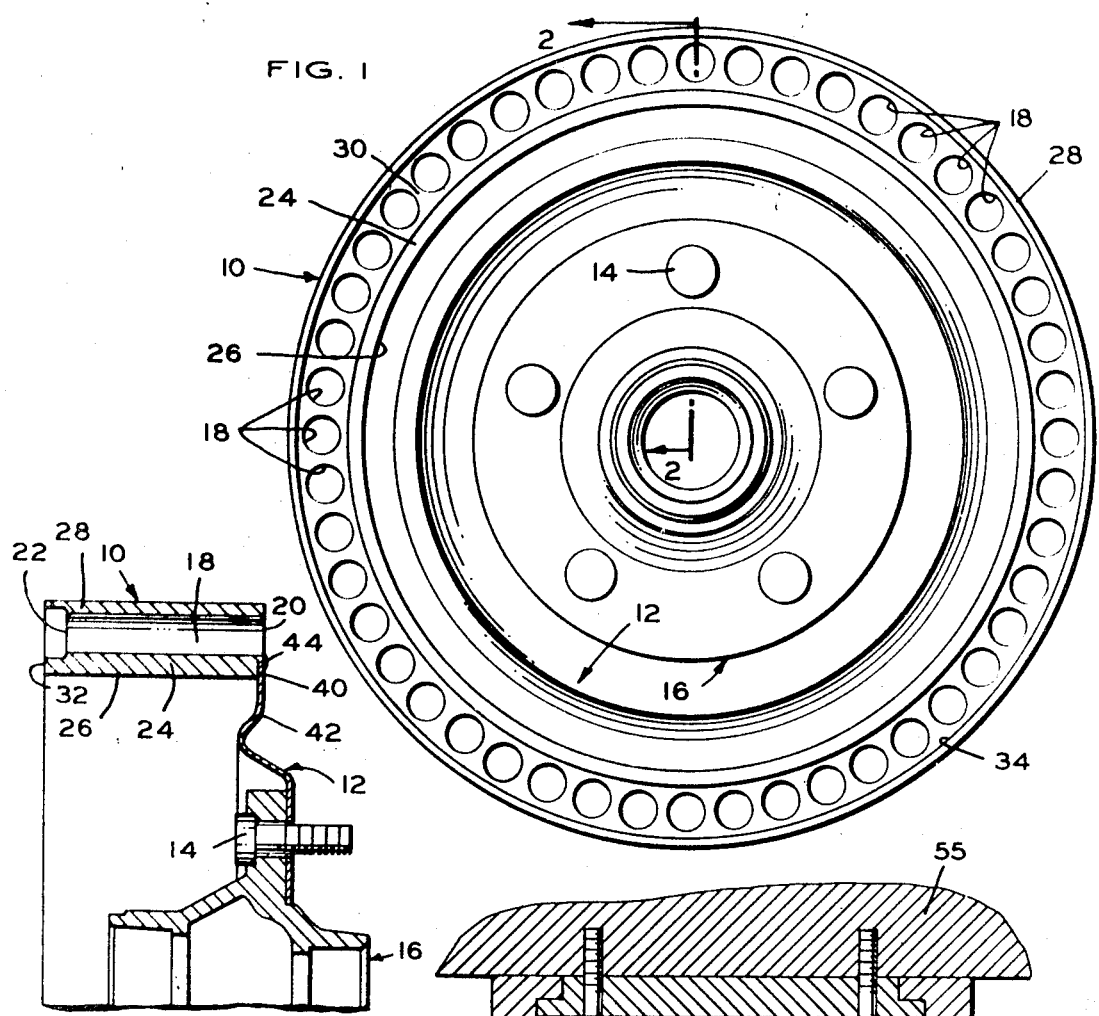
FIG. 1
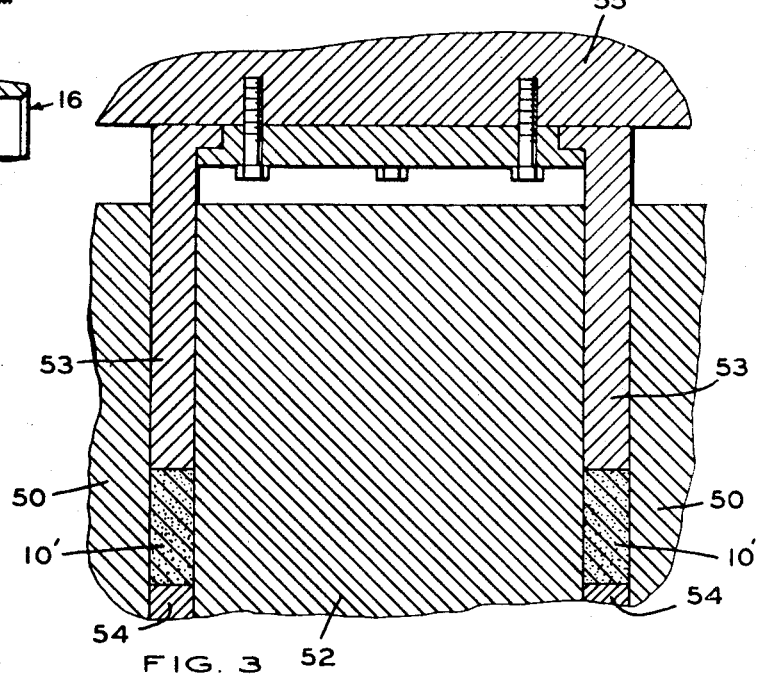
FIG. 2
FIG. 3
INVENTOR
CHARLES ROBERT TALMAGE
*Barnes, Kisselle, Raisch & Choate*
ATTORNEYS

METHOD OF MAKING A COMPOSITE BRAKE DRUM

This application is a division of my copending application Ser. No. 433,563, filed Feb. 18, 1965, now abandoned and entitled "Brake Drum."

This invention relates to motor vehicle brakes and more particularly to a fade resistant brakedrum and method and apparatus for making the same.

One of the most serious and longstanding problems in the development of the well known drum-type automotive brakes is known as "drum fade." This is a condition in drum-type brakes which occurs during prolonged or severe braking when the frictionally generated heat is not dissipated rapidly enough, causing it to expand radially beyond the limit of travel of the brakeshoes. In brakedrums of the type comprising a ring supported at one end by a back and free at the other end, the radial expansion is usually greater at the free end and causes a bell-mouthing effect which, in turn, causes uneven lining wear.

An object of the present invention is to provide an improved brake drum which has a high strength-to-weight ratio and improved heat dissipating structure to thereby provide a drum which is doubly resistant to drum fade.

Another object is to provide an improved ring for a brakedrum of the above character which is made from metal powder with ferrous metal as a major constituent which is sintered in a powder metallurgy process to thereby provide a relatively inexpensive drum ring having improved mechanical properties such as higher tensile strength, fatigue strength and modulus of elasticity, and which may be economically treated to provide good wear resistance in addition to the aforementioned fade-resisting characteristics.

A further object is to provide an improved brakedrum which is of composite construction including a sintered metal ring of the above character joined securely to a stamped sheet metal back to thereby provide a high strength, economical brakedrum assembly.

Another object of the present invention is to provide an improved method and apparatus for making a ring and/or brakedrum of the above character.

Other objects, features and advantages of the present invention including various details of structure, apparatus and method will be apparent from the following description of the illustrated embodiment shown in the accompanying drawings in which:

FIG. 1 is a side elevation of a brakedrum of the present invention shown attached to a conventional hub and viewed looking into the open end of the drum.

FIG. 2 is a radial section taken on the line 2—2 of FIG. 1.

FIG. 3 is a vertical section through a compacting die set illustrating one step in one method of making a brakedrum in accordance with the present invention.

Figure 4:
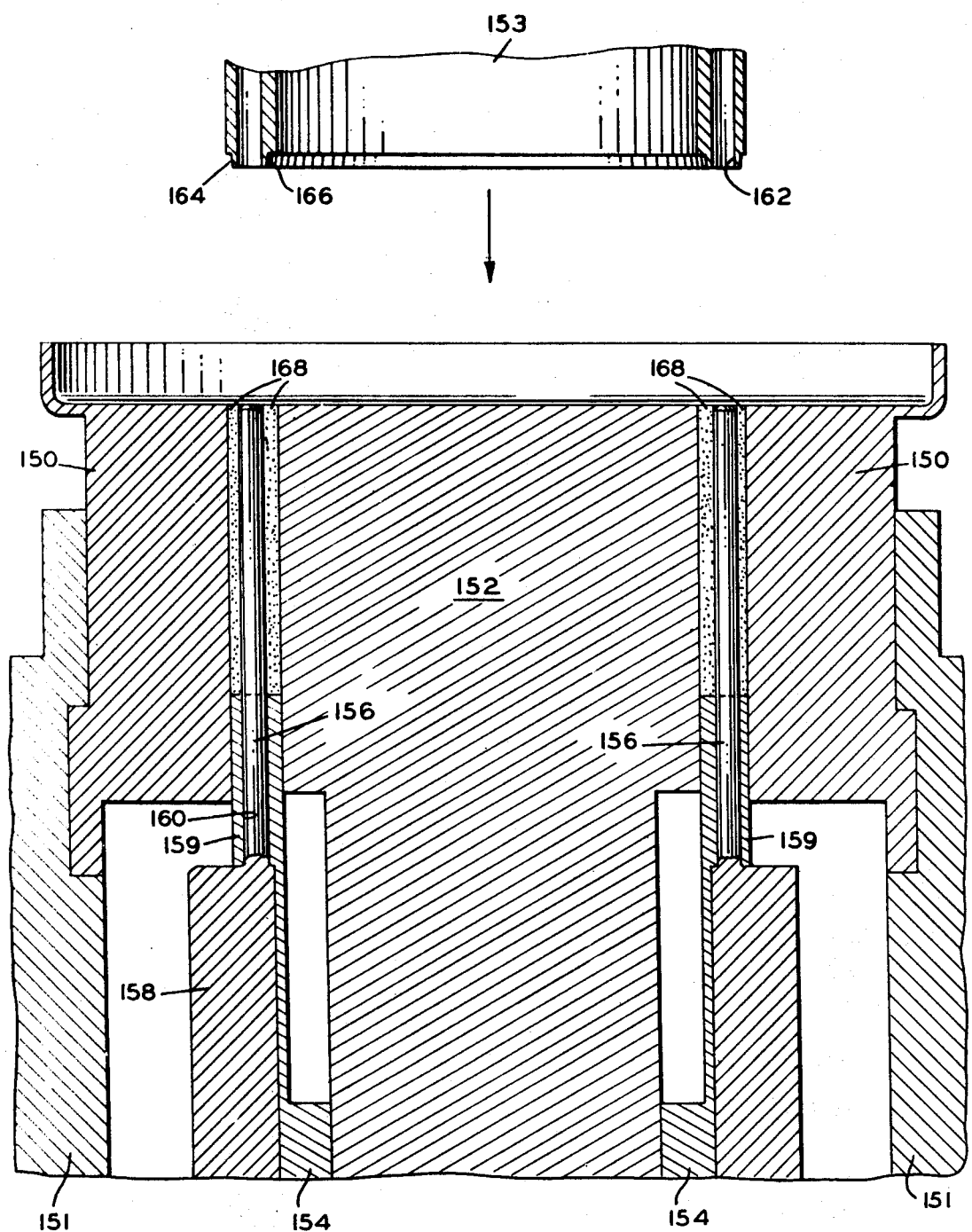
FIGS. 4, 5 and 6 are vertical center sections of a modified compacting apparatus illustrating a sequence of steps in another method of making a brakedrum both in accordance with the present invention.

Referring to FIGS. 1 and 2 of the drawings, the improved automotive brakedrum of the present invention comprises an assembly of a one-piece drum ring 10 and a stamped metal back 12 secured to one end of the ring. Back 12 is provided with five holes for receiving wheel-mounting bolts 14 which secure back 12 to a conventional wheel hub 16 in the usual manner.

Ring 10 is a relatively heavy walled, tubular shaped member in which is formed a plurality of holes 18 which extend parallel to the axis of the ring from one end face 20 of the ring to the other end face 22 thereof, the holes being open at their ends to permit free passage of air therethrough. As shown in FIG. 1, holes 18 are equally spaced around ring 10 and, by way of example, there is a total of 48 holes in a drum having an outside diameter of about 11½ inches. This multiplicity of axially extending passages, preferably in the form of cylindrical holes 18, may be considered for purposes of illustrative analysis to create three separate zones or structural portions in ring 10. When thus considered, there is an inner ring 24 which is a cylindrical, imperforate and integral portion of the drum ring. The smooth inner periphery of inner ring 24 forms the brake track 26 of the brakedrum. The portion of the drum ring disposed radially outwardly of holes 18 forms an outer ring 28 which is also a cylindrical, imperforate and integral portion of the drum ring, outer ring 28 being concentric with inner ring 24. For some applications, the smooth outer periphery of outer ring 28 may also serve as a brake track. Inner and outer rings 24 and 28 are integrally joined by the radially and axially extending webs 30 formed one between each adjacent pair of holes 18. It is to be understood that the foregoing analysis of ring 10 into three portions, i.e., inner ring 24, outer ring 28 and a multiplicity of webs 30, is intended merely to facilitate understanding of structural functions rather than by way of limitation.

As best seen in FIG. 2, end face 22 is axially offset inwardly of the end face 32 of inner ring 24 so that the lip of a conventional dust cover (not shown) may overlap end face 32 to cove the open end of the drum, as is well understood in the art. The face 20 of ring 10 has an annular pilot recess 40 to receive the annular mounting portion 42 of back 12.

In a preferred embodiment of the invention, back 12 is secured to end face 20 of ring 10 by a circumferentially continuous shielded arc weld 44 at the outer peripheral edge of back 12. It is to be noted that this arc welded joint has proven successful even when employed to unite a steel back 12 with a ring 10 made of sintered metal as disclosed hereinafter. In some applications using this arc welded joint it is desirable to infiltrate the sintered ferrous metal with a suitable material such as copper, thereby reducing or preventing internal oxidation in the weld.

Although drum ring 10 of the present invention could be made from cast iron or other suitable material by known casting techniques, ring 10 is preferably produced in ferrous material by a powder metallurgy process in accordance with the embodiments of the method of the present invention described hereinafter. The first step in both embodiments of this method comprises the preparation of a powder mix which, by way of illustration, comprises the following proportions by weight:

96 parts Iron powder
3 parts Copper powder (copper content can be varied)
1 part Graphite
1 part Stearate or other suitable lubricant The above-listed ingredients in powder form are intermixed mechanically.

In the first embodiment of the method, the next step is to place the proper volume of the powder mix in a suitable die set such as that shown schematically in FIG. 3. This die set includes a lower annular outer die 50 fixedly supported on a suitable press bed (not shown), a cylindrical inner core die 52, and upper and lower annular pressure dies 53 and 54. Dies 50 and 52 are suitably shaped and concentrically disposed to form an annular mold cavity radially therebetween which corresponds to the outer dimensions and general shape of drum ring 10 in the fully closed position of the dies (FIG. 3). Upper die 53 is adapted to be pressed downwardly by an associated ram 55 of a high-pressure press, and lower die 54 is similarly actuated but in the opposite direction. In order to fill the mold with powder mix, upper die 53 is raised to permit access to the mold cavity.

After the powder mix has been poured into the mold cavity, the powder is leveled with the top of dies 50 and 52. Then the loose powder is compacted by pressing die 53 downwardly and die 54 upwardly as indicated by the arrows in FIG. 3. The powder apparent density, die compression ratio and pressing force are selected to produce a green compact 10' having the desired density.

After the pressing or compacting step, the die set is opened by raising die 53 so that the resulting green compact 10' can be suitably removed from the die set.

The next step in both embodiments of the method comprises sintering the green compact 10' under normal sintering conditions for obtaining pearlitic material, such as at about 2050° F. in a dissociated ammonia atmosphere for one hour. This heating of the compact at an elevated temperature below the melting point of the major constituent causes the green compact to sinter into a single, strong, smooth metallic part wherein the materials are no longer in the form of powder, and the graphite has combined, resulting in a pearlite structure.

In the first embodiment of the method, after the sintered ring 10 has been cooled it is machined to its finished form as shown in FIGS. 1 and 2 by suitable drilling, turning and/or other conventional metal working steps. Ring 10 is then ready for assembly, preferably with a stamped steel back 12 which, as previously described, is arc welded to the ring.

It will now be apparent that the foregoing method provides a way of making the brakedrum of the invention in ferrous material of uniform density and composition. Both density and composition can be readily modified to provide desired changes in the resultant material properties. Also, in lieu of or supplemental to introduction in the powder mixing step, the copper component may be introduced by infiltration methods as disclosed and claimed in my copending application Ser. No. 342,158, filed Feb. 3, 1964. now U.S. Pat. No. 3,326,678.

Figure 5:
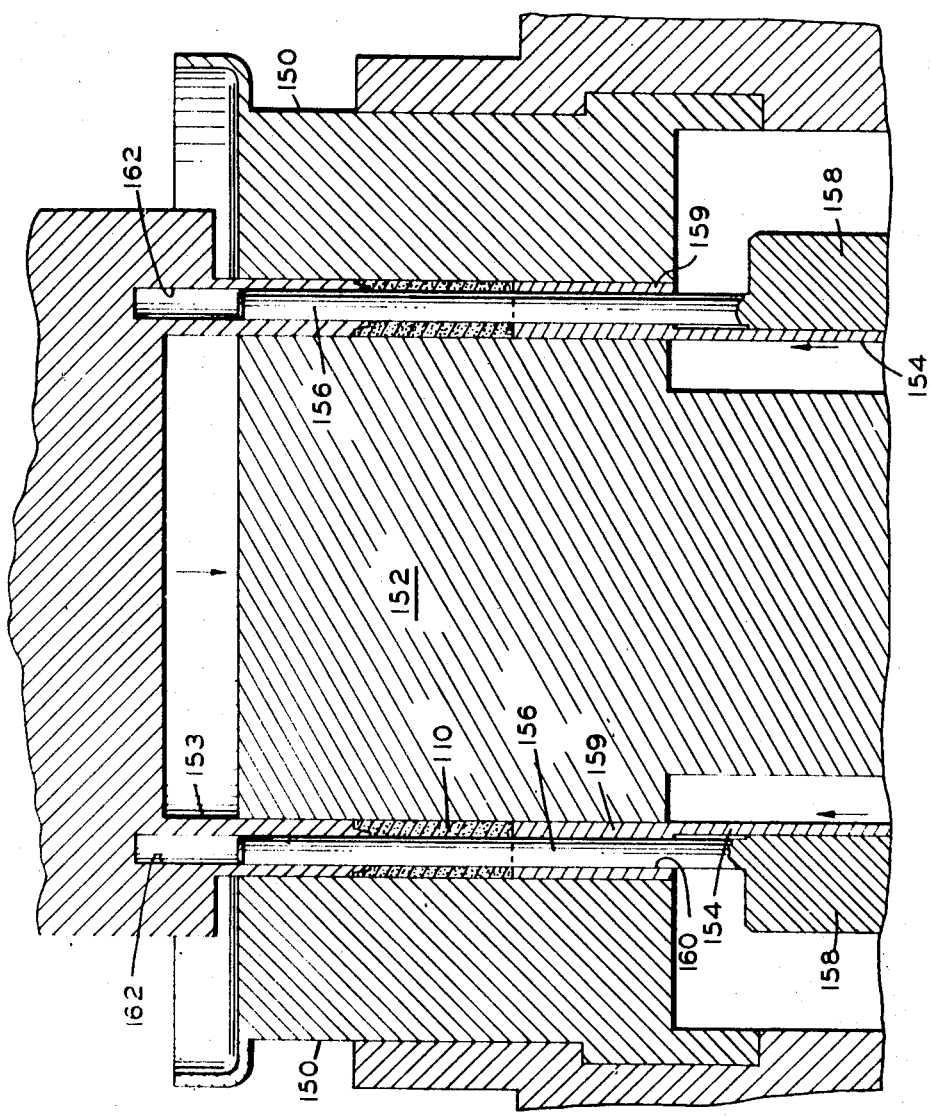
Figure 6:
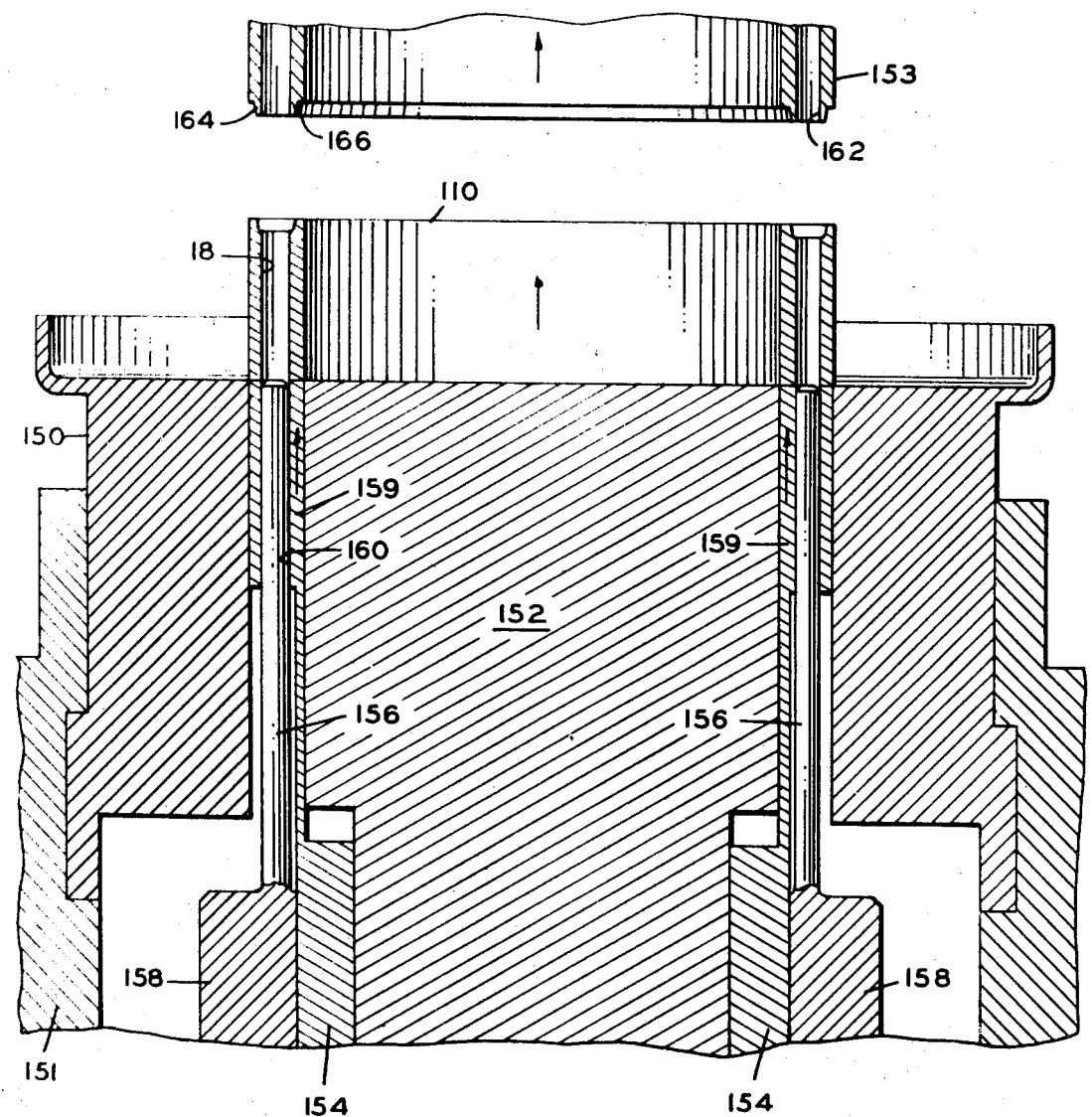

The above described method may be modified in accordance with the present invention to form the multiplicity of holes 18 simultaneously with the compacting steps by use of the modified compacting die set illustrated in simplified form in FIGS. 4, 5 and 6.

Referring to FIG. 4, the modified die set includes an annular outer die 150 supported on a press bed 151, a cylindrical inner core 152 suitably supported concentrically within die 150, an upper annular punch 153 carried by a ram of the press (not shown), a lower annular punch 154 and a plurality of core pins 156 corresponding in number and location to holes 18 of ring 10. Pins 156 are fixed to a carrier 158 which slidably encircles the lower portion of punch 154. The upper portion 159 of punch 154 is vertically movable with a close sliding fit in the annular space or cavity of the die set defined radially between core 152 and die 150. Pins 156 extend upwardly from carrier 158, slidably through holes 160 in upper portion 159 of punch 154 and thence upwardly through the cavity of the die set. Upper punch 153 also has a plurality of holes 162 adapted to slidably receive the upper ends of pins 156. Punch 153 is adapted to be received in the die cavity with a close sliding fit and its lower face is suitably contoured as at 164 and 166 complemental to the finished end contour of ring 10.

As in the compact forming steps of the previously described method, the modified method comprises the steps of pouring the powder mix 168 into the mold cavity with the die set parts positioned as shown in FIG. 4. The powder is leveled with the top of core 152 and die 150, pins 156 also being positioned with their upper ends flush therewith.

As illustrated in FIG. 5, the next step of the modified method comprises compacting the loose powder 168 by forcing punch 153 downwardly into the mold cavity while simultaneously forcing punch 154 upwardly as indicated by the arrows in FIG. 5 to thereby compress the powder into the green compact 110. The upper ends of pins 156 are received in holes 162 of punch 153 as the upper and lower punches move toward one another in this compacting step.

As shown in FIG. 6, the next step in the modified method comprises ejecting compact 110 from the mold cavity. This is accomplished by retracting punch 153 upwardly to withdraw the same from the mold cavity while simultaneously further elevating punch 154, pins 156 being held stationary by carrier 158 so that compact 110 is stripped from pins 156 as it is pushed by punch 154 upwardly out of the die cavity to the ejected position thereof shown in FIG. 6. It is to be understood that the compacting die set employed in the modified method is preferably provided with suitable draft angles on core 152 and outer die 150 as well as on the upper portions of pins 156 so that these parts can be slightly tapered to facilitate ejection of the compact from the die set. However, compact 110 at this point is essentially identical in shape and size to the finished ring 10 of FIGS. 1 and 2, holes 18 having been cored in the compacting step by pins 156.

Compact 110 is then sintered as previously described. However, the finish machining steps required subsequent to sintering in the previously described method are substantially eliminated by the modified method, thereby significantly reducing the manufacturing cost of the brakedrum.

Referring to the improved product of the invention, ring 10 has a section modulus which is much greater than equal weight prior art drums which are of relatively radially thin design. Due to the relatively large radial thickness of ring 10, it resists expansion caused by mechanical stress when brake track 26 is engaged by the brake shoes. In addition, ring 10 has a much greater cooling surface area exposed to air due to the multiplicity of axial holes 18 which conduct air currents through the ring.

Outer ring 28 also provides additional heat transfer area and, being a full ring and being spaced radially outwardly from the brake surface 26 by the multiplicity of thin webs 30, remains relatively cool during a stop. Hence outer ring 28 also functions to circumferentially restrain inner ring 24 against its tendency to expand radially, thereby further resisting thermal expansion of the drum and resultant drum fade.

Ring 10 when made of sintered iron rather than cast iron can have a much higher tensile strength, which in turn provides a much greater resistance to fracture resulting from extreme stress conditions such as the aforementioned differential expansion stresses. Ring 10 also provides increased resistance to stresses tending to produce distortions such as out-of-roundness and bell-mouthing due to outer ring 28 as well as webs 30 being axially coextensive with the inner ring 24. The cylindrical shape of the air passage holes 18 is economical to produce, particularly when cored as disclosed herein, and also results in webs 30 having an ideal section for compression loading, i.e., each web has an "hourglass" shape in radial cross section (FIG. 1) due to its cylindrical concave sidewalls, and each web is securely united with the inner and outer rings 24 and 28 due to the integral connection of its inner and outer radial ends with these rings. The "perforated" geometry of ring 10, plus its enhanced heat conductivity when copper has been infiltrated into the sintered iron, combine to provide an improved heat transfer and storage device.

Referring to the illustrated embodiment of drum ring 10, successful results have been obtained by employing dimensions as set forth below by way of illustration and not by way of limitation:

Outside diameter of ring 10   11.437 inches
Inside diameter of inner ring portion 24   9.5 inches
Radial thickness of outer ring portion 28   k0.125 inches
Diameter of holes 18   0.578 inches
Radial thickness of inner ring portion 24   0.265 inches

I claim:

1. A method of making a composite brakedrum having a drum ring and a mounting back secured to one end of the ring comprising the steps of providing a compacting die set having inner and outer dies defining an annular tapered cavity radially therebetween with inner and outer diameters substantially the same as those of the finished ring and having a pair of annular punches one movable axially into each opposite end of the cavity, positioning a plurality of tapered core pins in circumferentially spaced relation in said cavity with the taper of said pins oriented oppositely relative to the taper of said cavity and with said pins extending slidably through one of said punches and axially through said cavity intermediate the inner and outer peripheries thereof, placing a predetermined quantity of ferrous powder adapted for subsequent sintering into friction material in the die cavity and around said core pins therein while one of said punches is positioned to form one end wall of the cavity and the other one of said punches is retracted from the cavity to permit said placing of said powder in the cavity, causing relative axial movement of one punch toward the other to thereby compact the powder contained in the cavity between the punches at high pressure to form an annular compact therein, removing the compact from the cavity in the direction of divergence of the cavity taper, removing the core pins from the compact in the direction of divergence of the core pin taper, thereafter sintering the compact to thereby provide a sintered ring having a plurality of passages extending axially between the end faces of the ring intermediate the inner and outer peripheries of the ring, and thereafter securing a stamped metal back to one end of said sintered drum ring.

2. The method set forth in claim 1 wherein said steps of removing the compact from the cavity and removing the core pins from the compact comprises moving said punches in the same direction axially relative to said dies and to said core pins to thereby eject the compact from one end of the cavity and strip the compact from the core pins.

3. The method set forth in claim 1 wherein said back comprises a stamped steel back and said step of securing said back to said ring comprises producing with a shielded arc a welded seam interconnecting said ring and back.

4. The method set forth in claim 1 wherein said core pins are held stationary in said position during said steps of compacting and removing the compact from the cavity and the core pins from the compact.

5. A method of making a brake drum of the type having a drum ring with an inner cylindrical braking surface adapted to cooperate with brake shoes radially outwardly expansible thereagainst and a steel back extending radially of the axis of the drum ring for mounting said brakedrum to a wheel or the like, comprising the steps of compacting at high pressure in the annular cavity of a compacting press an intermixture of metal powders having a ferrous metal as at least a major constituent into a one-piece ferrous metal powder compact having substantially the form of the drum ring as it exits in its finished form, sintering said compact in a protective atmosphere chamber of a sintering furnace, and thereafter removing the sintered drum ring from said chamber, cooling the sintered drum ring and then securing a steel back to one end of the sintered drum ring by producing a circumferentially extending weld between a peripheral portion of said back and said one end of said ring.